US008826062B2

(12) United States Patent
Bauernfeind (10) Patent No.: US 8,826,062 B2
(45) Date of Patent: *Sep. 2, 2014

(54) APPARATUS FOR SYNCHRONIZING A DATA HANDOVER BETWEEN A FIRST CLOCK DOMAIN AND A SECOND CLOCK DOMAIN THROUGH PHASE SYNCHRONIZATION

(75) Inventor: Thomas Bauernfeind, Arbing (AT)

(73) Assignee: Intel Mobile Communications GmbH, Neubiberg (DE)

( * ) Notice: Subject to any disclaimer, the term of this patent is extended or adjusted under 35 U.S.C. 154(b) by 480 days.

This patent is subject to a terminal disclaimer.

(21) Appl. No.: 13/113,340

(22) Filed: May 23, 2011

(65) Prior Publication Data

US 2012/0303996 A1 Nov. 29, 2012

(51) Int. Cl.
*G06F 1/10* (2006.01)
*H04L 7/00* (2006.01)

(52) U.S. Cl.
CPC ............... *H04L 7/0012* (2013.01); *G06F 1/10* (2013.01); *H04L 7/0029* (2013.01)
USPC ..................................... 713/503; 375/240.28

(58) Field of Classification Search
USPC ......... 713/375, 400, 401, 500, 501, 502, 503, 713/600, 601; 375/240
See application file for complete search history.

(56) References Cited

U.S. PATENT DOCUMENTS 5,263,057 A  11/1993 Nawrocki et al.
5,513,224 A * 4/1996 Holt ............................. 375/372
6,249,875 B1  6/2001 Warren
6,396,853 B1  5/2002 Humphrey et al.
6,581,165 B1 * 6/2003 Weintraub .................... 713/400
7,315,600 B2  1/2008 Sigurdsson et al.
7,366,943 B1  4/2008 Owen
7,498,957 B2  3/2009 De Buys (Continued)

FOREIGN PATENT DOCUMENTS

DE       102005018858 B4   9/2009
EP           1263161 A1    12/2002
WO        2004013964 A2    2/2004

OTHER PUBLICATIONS

International Search Report and Written Opinion dated Sep. 5, 2012 for International Application No. PCT/EP2012/059631. 11 Pages.

(Continued)

*Primary Examiner* — Stefan Stoynov
*Assistant Examiner* — Paul J Yen
(74) *Attorney, Agent, or Firm* — Eschweiler & Associates, LLC (57) ABSTRACT

An apparatus for synchronizing a data handover is disclosed. The calculator is clocked with a clock of a first clock domain and configured to provide synchronization pulse cycle duration information describing a temporal position of a synchronization pulse at a clock of the second clock domain. The synchronization pulse generator is clocked with the clock of the second clock domain and configured to generate the synchronization pulse such that the synchronization pulse is located at the temporal position described by the synchronization pulse cycle duration information. The phase information provider is clocked with the clock of the second clock domain and configured to provide a phase information describing a phase relation between the synchronization pulse and the clock of the first clock domain. The feedback path is configured for feeding back the phase information to the calculator and to adjust the synchronization pulse cycle duration information based on the phase information.

25 Claims, 8 Drawing Sheets

(56) References Cited

U.S. PATENT DOCUMENTS

| | | |
|---|---|---|
| 2002/0196886 A1 | 12/2002 | Adkisson |
| 2002/0199124 A1 | 12/2002 | Adkisson |
| 2003/0081713 A1 | 5/2003 | Pontius et al. |
| 2003/0174795 A1* | 9/2003 | Bruhnke et al. ............. 375/354 |
| 2004/0223516 A1 | 11/2004 | Adkisson et al. |
| 2004/0223570 A1* | 11/2004 | Adkisson ..................... 375/359 |
| 2005/0041691 A1* | 2/2005 | Laufer et al. ................ 370/503 |
| 2006/0017472 A1 | 1/2006 | Adkisson |
| 2006/0023819 A1 | 2/2006 | Adkisson et al. |
| 2006/0023820 A1 | 2/2006 | Adkisson et al. |
| 2006/0190756 A1* | 8/2006 | Okamura ..................... 713/503 |
| 2006/0214825 A1 | 9/2006 | Kanazashi |
| 2006/0250287 A1 | 11/2006 | Menkhoff et al. |
| 2009/0164827 A1 | 6/2009 | Komninakis et al. |
| 2009/0193285 A1* | 7/2009 | Lutscher ...................... 713/600 |
| 2010/0057821 A1 | 3/2010 | Menkhoff |

OTHER PUBLICATIONS

U.S. Appl. No. 13/113,730, filed May 23, 2011. 42 Pages.
Final Office Action dated Dec. 11, 2013 for U.S. Appl. No. 13/113,730. 47 Pages.
International Preliminary Report on Patentability for PCT/EP2012/059625 dated Dec. 5, 2013.
Office Action dated Aug. 26, 2013 for U.S. Appl. No. 13/113,730.
Office Action Dated Apr. 18, 2014 U.S. Appl. No. 13/113,730.

* cited by examiner

APPARATUS FOR SYNCHRONIZING A DATA HANDOVER BETWEEN A FIRST CLOCK DOMAIN AND A SECOND CLOCK DOMAIN THROUGH PHASE SYNCHRONIZATION

FIELD

Embodiments of the present invention relate to an apparatus for synchronizing a data handover between a first clock domain and a second clock domain. Some embodiments of the present invention relate to a synchronization for high data rate fractional sample rate converters.

BACKGROUND

A synchronization of two clock domains for data handover is used in a variety of applications such as in sample rate converters (SRC) and fractional sample rate converters (FSRC).

SUMMARY

Embodiments of the present invention provide an apparatus for synchronizing a data handover between a first clock domain and a second clock domain. The apparatus comprises a calculator, a synchronization pulse generator, a phase information provider and a feedback path. The calculator is clocked with a clock of the first clock domain and configured to provide synchronization pulse cycle duration information describing a temporal position of a synchronization pulse at a clock of the second clock domain. The synchronization pulse generator is clocked with the clock of the second clock domain and configured to generate the synchronization pulse such that the synchronization pulse is located at the temporal position described by the synchronization pulse cycle duration information. The phase information provider is clocked with the clock of the second clock domain and configured to provide phase information describing a phase relation between the synchronization pulse and the clock of the first clock domain. The feedback path is configured to feed back the phase information to the calculator. In addition, the calculator is configured to adjust the synchronization pulse cycle duration information based on the phase information.

Some embodiments of the present invention provide an apparatus for synchronizing a data handover between a first clock domain and a second clock domain. The apparatus comprises a calculator, a synchronization pulse generator, a phase information provider, a feedback path, a first data processor and a second data processor. The calculator is clocked with a clock of the first clock domain and configured to provide synchronization pulse cycle duration information describing a temporal position of a synchronization pulse at a clock of the second clock domain. The synchronization pulse generator is clocked with the clock of the second clock domain and configured to generate the synchronization pulse such that the synchronization pulse is located at the temporal position described by the synchronization pulse cycle duration information. The phase information provider is clocked with the clock of the second clock domain and configured to provide information describing a phase relation between the synchronization pulse and the clock of the first clock domain. The feedback path is configured to feed back the phase information to the calculator. The first data processor is clocked with the clock of the first clock domain and configured to process an input data such that a reload value and an increment value are provided in synchronization with the first clock domain for handover to the second clock domain. The second data processor is clocked with the clock of the second clock domain and configured to receive the reload value and the increment value in synchronization with the second clock domain and in response to the synchronization pulse. The second data processor is further configured to process the reload value and the increment value such that an output data is provided in synchronization with the second clock domain. In addition, the calculator is configured to adjust the synchronization pulse cycle duration information based on the phase information.

Further embodiments of the present invention provide a method for synchronizing a data handover between a first clock domain and a second clock domain. In a first step, synchronization pulse cycle duration information describing a temporal position of a synchronization pulse at a clock of the second clock domain is provided in the first clock domain. In a second step, the synchronization pulse is generated in the second clock domain such that the synchronization pulse is located at the temporal position described by the synchronization pulse cycle duration information. In a third step, phase information describing a phase relation between the synchronization pulse and the clock of the first clock domain is provided in the second clock domain. In a fourth step, the phase information is fed back to the first clock domain. In a fifth step, the synchronization pulse cycle duration information is adjusted based on the phase information.

BRIEF DESCRIPTION OF THE DRAWINGS

Embodiments of the present invention are described herein making reference to the appended drawings.

Equal or equivalent elements or elements with equal or equivalent functionality are denoted in the following description by equal or equivalent reference numerals.

DETAILED DESCRIPTION

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 1:
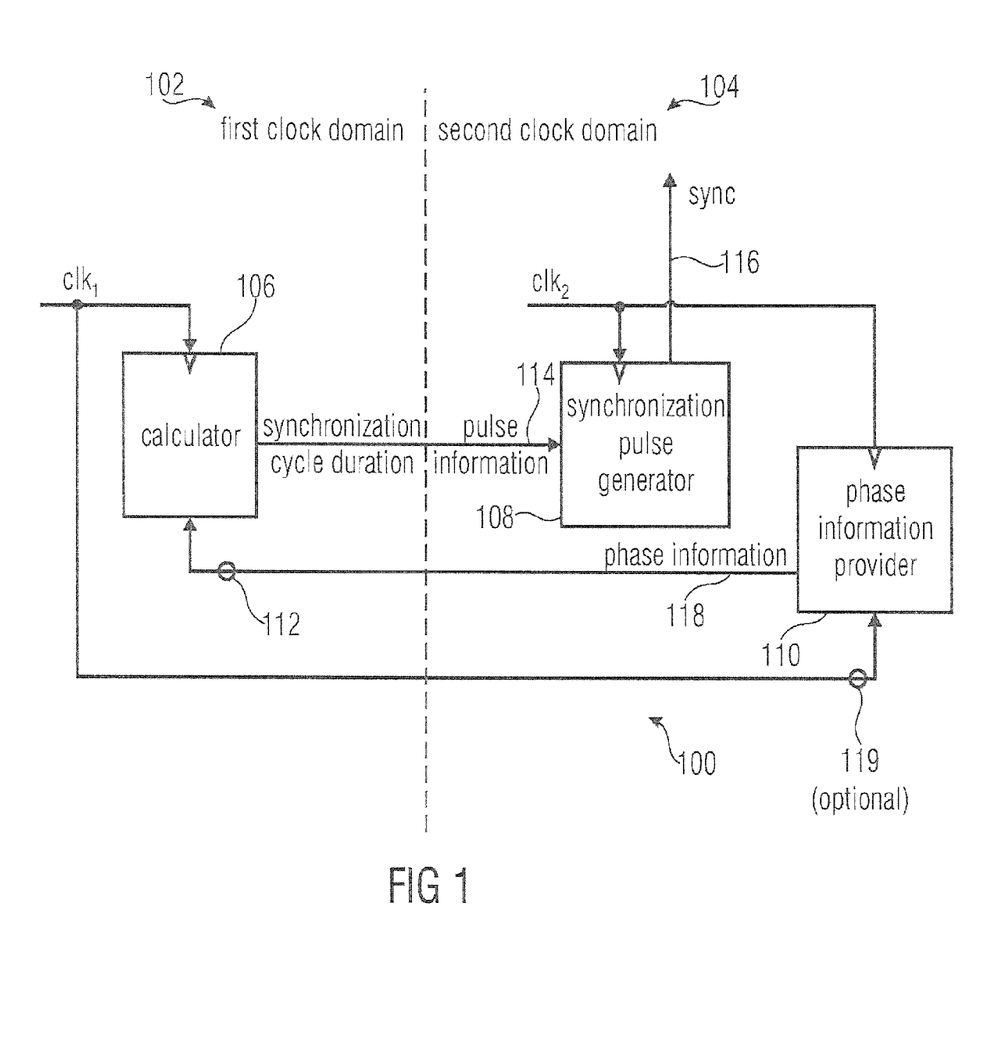
FIG. 1 shows a block diagram of an apparatus for synchronizing a data handover between a first clock domain and a second clock domain according to an embodiment of the present invention.

FIG. 1 shows a block diagram of an apparatus 100 for synchronizing a data handover between a first clock domain 102 and a second clock domain 104 according to an embodiment of the present invention. The apparatus 100 comprises a calculator 106, a synchronization pulse generator 108, a phase information provider 110 and a feedback path 112. The calculator 106 is clocked with a clock $clk_1$ of the first clock domain 102 and configured to provide a synchronization pulse cycle duration information 114 describing a temporal position of a synchronization pulse 116 at a clock of $clk_2$ of the second clock domain 104. The synchronization pulse generator 108 is clocked with the clock $clk_2$ of the second clock domain 104 and configured to generate the synchronization pulse 116 such that the synchronization pulse 116 is located at the temporal position described by the synchronization pulse cycle duration information 114. The phase information provider 110 is clocked with the clock $clk_2$ of the second clock domain 104 and configured to provide a phase information 118 describing a phase relation between the synchronization pulse 116 and the clock $clk_1$ of the first clock domain 102. The feedback path 112 is configured for feeding back the phase information 118 to the calculator 106. In addition, the calculator 106 is configured to adjust the synchronization pulse cycle duration information 114 based on the phase information 118.

In embodiments, the calculator 106 is clocked with the clock $clk_1$ of the first clock domain 102, where the synchronization pulse generator 108 is clocked with the clock $clk_2$ of the second clock domain 104, the clock $clk_2$ of the second clock domain 104 being, for example, greater than the clock $clk_1$ of the first clock domain 102 or vice versa. The synchronization pulse generator 108 is configured to generate the synchronization pulse 116 at the temporal position described by the synchronization pulse cycle duration information 114. Thereby, the synchronization pulse 116 only can be generated at a clock, e.g. rising or falling clock edge, of the second clock domain 104, since the synchronization pulse generator 108 is clocked with the clock $clk_2$ of the second clock domain 104. Hence, the synchronization pulse 116 is located at a specific clock, e.g. a specific rising or falling clock edge, of the second clock domain 104, the specific clock being defined by the temporal position described by the synchronization pulse cycle duration information 114.

Furthermore, the synchronization pulse cycle duration information 114 can describe the period of the synchronization pulse 116 and hence the temporal position of the synchronization pulse 116. By feeding back the phase information 118 describing the phase relation between the synchronization pulse 116 and the clock $clk_1$, e.g. rising or falling clock edge, of the first clock domain 102, the calculator 106 can calculate the synchronization pulse cycle duration information 114 (or period of the synchronization pulse 116) such that the synchronization pulse 116 is located at or shifted to the desired temporal position.

In other words, the apparatus 100 according to the concept of the present invention is able to provide a correct and failsafe synchronization between the first clock domain 102 and the second clock domain 104, e.g. for a secure data handover between the first clock domain 102 and the second clock domain 104, by establishing a synchronized phase relation between the first clock domain 102 and the second clock domain 104 by means of the synchronization pulse 116 generated by the synchronization pulse generator 108.

In one embodiment, the clock $clk_1$ of the first clock domain 102 may be fed into the phase information provider 110 by a path 119, where the phase information provider 110 can be configured to detect a phase relation between the synchronization pulse 116 and the clock $clk_1$ of the first clock domain 102 and to provide the phase information 118 such that the phase information 118 describes the detected phase relation.

Figure 2:
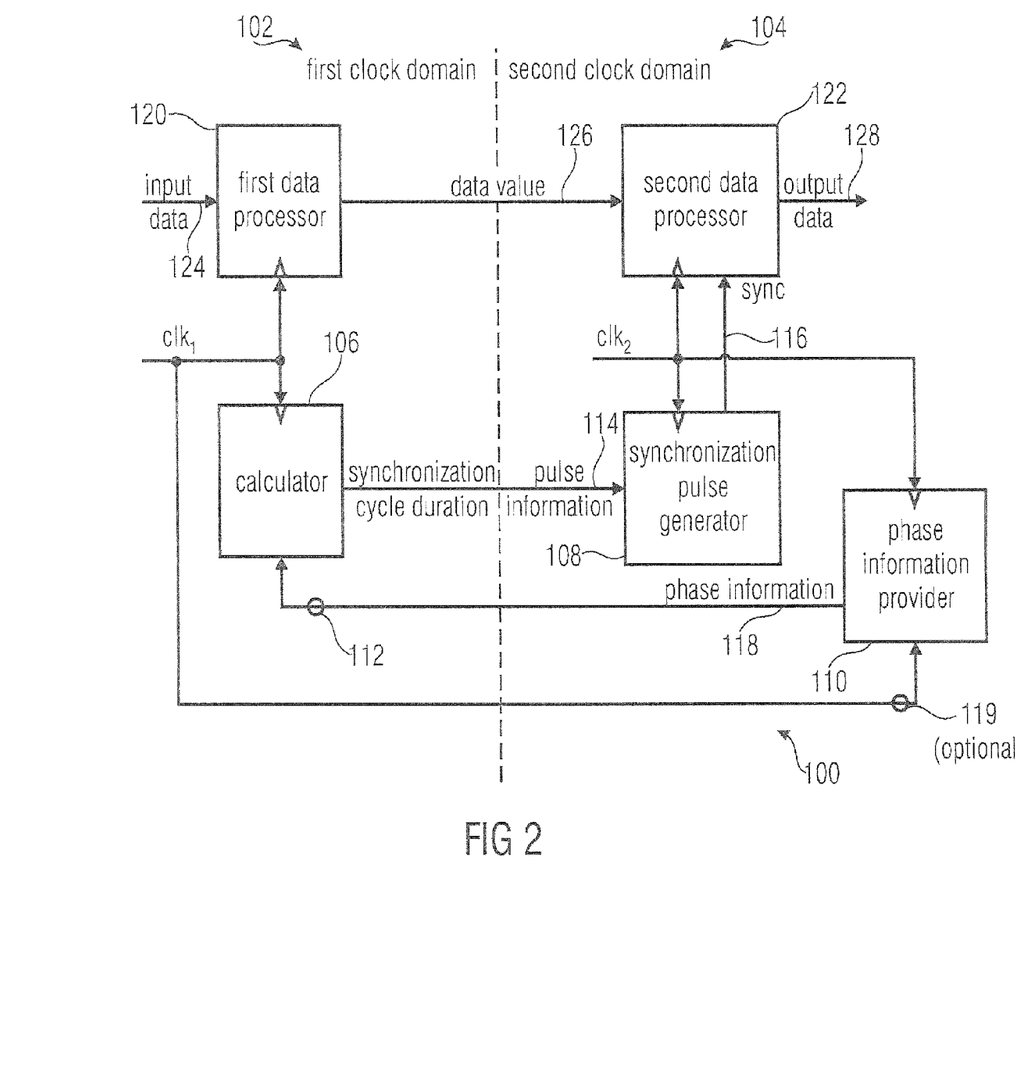
FIG. 2 shows a block diagram of the apparatus for synchronizing the data handover between the first clock domain and the second clock domain shown in FIG. 1 further comprising a first data processor and a second data processor.

FIG. 2 shows a block diagram of the apparatus 100 for synchronizing the data handover between the first clock domain 102 and the second clock domain 104 shown in FIG. 1 further comprising a first data processor 120 and a second data processor 122. The first data processor 120 is clocked with the clock $clk_1$ of the first clock domain 102 and configured to process an input data 124 such that a data value 126 is provided in synchronization with the clock $clk_1$ of first clock domain 102 for handover to the second clock domain 104. The second data processor 122 is clocked with the clock $clk_2$ of the second clock domain 104 and configured to receive the data value 126 in synchronization with the clock $clk_2$ of the second clock domain 104 and in response to the synchronization pulse 116. The second data processor 122 is further configured to process the data value 126 such that an output data 128 is provided in synchronization with the clock $clk_2$ of the second clock domain.

In some embodiments, the calculator 106 can be configured to provide the synchronization pulse cycle duration information 114 such that the temporal position of the synchronization pulse 116 is maintained within a predetermined area around a target position defined relative to the clock $clk_1$ of the first clock domain 102. For example, the target position can be centered between subsequent clocks, e.g. subsequent rising or falling clock edges, of the first clock domain 102.

In addition, the calculator 106 can be configured to provide the synchronization pulse cycle duration information 114 such that the synchronization pulse cycle duration information 114 describes the temporal position of the synchronization pulse 116 at the clock $clk_2$ of the second clock domain 104 different from a position of the clock $clk_1$ of the first clock domain 102. By not positioning or locating the synchronization pulse 116 at or near the positions of the clock $clk_1$ of the first clock domain 102 setup and hold times can be guaranteed, thereby providing a secure data handover between the first clock domain 102 and the second clock domain 104.

In another embodiment, the clock $clk_1$ of the first clock domain 102 may be fed into the phase information provider 110 by a path 119, where the phase information provider 110 can be configured to detect a phase relation between the synchronization pulse 116 and the clock $clk_1$ of the first clock domain 102 and to provide the phase information 118 such that the phase information 118 describes the detected phase relation.

In the following, a fractional sample rate converter (FSRC) is described as an exemplary embodiment of the apparatus 100 for synchronizing a data handover between a first clock domain 102 and a second clock domain 104. Moreover, a frequency ratio between a clock frequency of the second clock domain 104 and a clock frequency of the first clock domain 102 is a fractional number, where the clock frequency of the second clock domain 104 is greater than the clock frequency of the first clock domain 102. In other words, in the following, the first clock domain 102 is clocked with a low frequency $f_{clk,low}$ and referred to as low the frequency clock domain, where the second clock domain 104 is clocked with a high frequency $f_{clk,high}$ and referred to as the high frequency clock $clk_{high}$ domain. Naturally, features of the following description are also applicable to the apparatus 100 for synchronizing the data handover between the first clock domain 102 and the second clock domain 104 shown in FIGS. 1 and 2.

Figure 3:
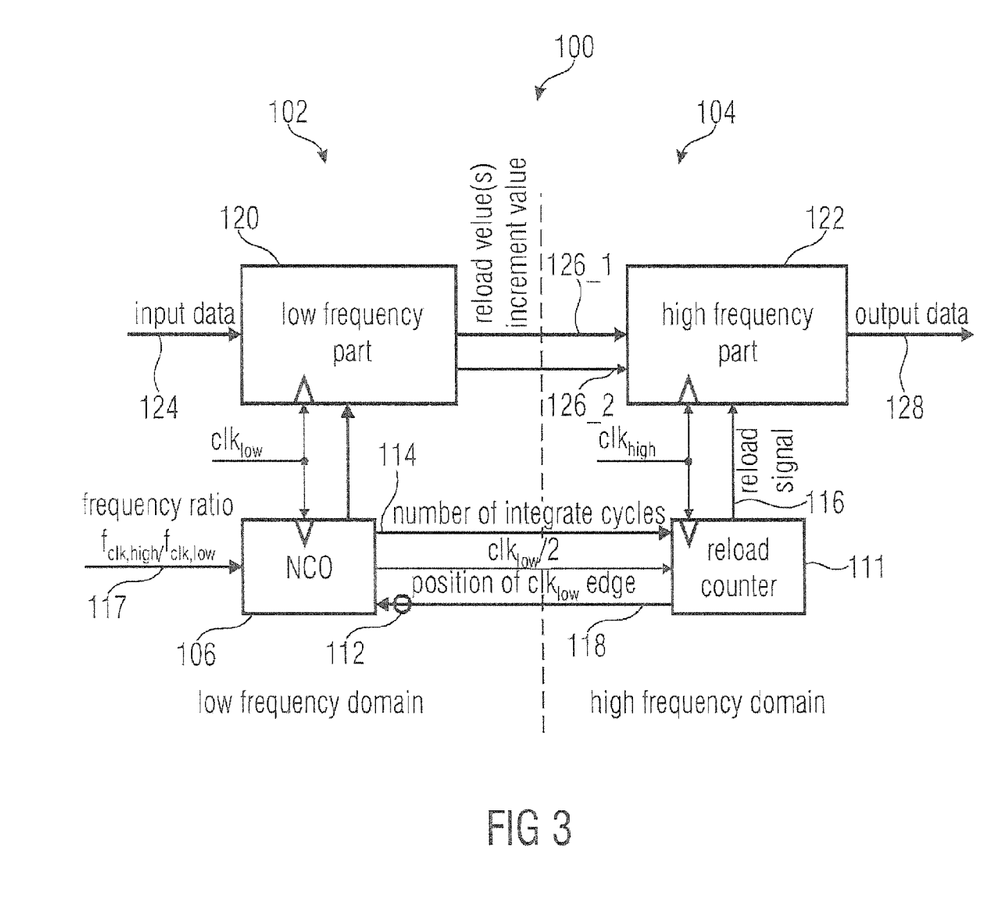
FIG. 3 shows a block diagram of a fractional sample rate converter according to an embodiment of the present invention.

FIG. 3 shows a block diagram of a fractional sample rate converter 100 according to an embodiment of the present invention. The fractional sample rate converter 100 comprises a calculator (NCO) 106, a reload counter 111, a feedback path 112, a first data processor (low frequency part) 120 and a second data processor (high frequency part) 122.

The calculator 106 can be configured to provide the synchronization pulse cycle duration information 114 such that the synchronization pulse cycle duration information 114 represents a number of clock cycles in the high frequency clock domain 114. Thereby, the synchronization pulse cycle duration information 114 defines the number of clock cycles in the high frequency clock domain between subsequent synchronization pulses 116 and hence the period of the synchronization pulse 116. Moreover, the calculator 106 can be configured to adjust the temporal position of the synchronization pulse 116 by increasing or decreasing the number of clock cycles in the high frequency clock domain 114 in order to keep a predetermined phase relation between the synchronization pulse 116 and the clock $clk_{low}$ of the low frequency clock domain 102.

As shown in FIG. 3, the calculator 106 can be implemented as a numerically controlled oscillator (NCO). Furthermore, in one embodiment the reload counter 111 can comprise the synchronization pulse generator 108 and the phase information provider 110 shown in FIGS. 1 and 2.

The numerically controlled oscillator 106 and the first data processor 120 are clocked with the clock $clk_{low}$ of the low frequency clock domain 102, where the reload counter 111 and the second data processor 122 are clocked with the clock $clk_{high}$ of the high frequency clock domain 104.

The first data processor 120 can be configured in one embodiment to process an input data 124 such that a reload value 126_1 and an increment value 126_2 are provided in synchronization with the low frequency clock domain 102 for handover to the high frequency clock domain 104. The second data processor 122 is configured to receive the reload value 126_1 and the increment value 126_2 in synchronization with the high frequency clock domain 104 and in response to the synchronization pulse (reload signal) 116. The second data processor 122 is further configured to process the reload value 126_1 and the increment value 126_2 such that an output data 128 is provided in synchronization with the high frequency clock domain 104. Furthermore, the synchronization pulse 116 can be referred to as reload signal or reload pulse since the second data processor 122 is configured to receive, or in other words, to reload the reload value 126_1 and the increment value 126_2 in response to the synchronization pulse 116 in one embodiment.

In a fully digital power RF (RF=Radio Frequency) transmitter, replication spectra of the DCO (DCO=Digital Control Oscillator) input signal and the input signal of the amplitude path DAC (DAC=Digital to Analogue Converter) may appear in the output signal of the RF transmitter. This replication spectra can violate the emission mask of the supported transmission standard, such as global system for mobile communications (GSM), universal mobile telecommunications system (UMTS), long term evolution (LTE), code division multiple access (CDMA) and the like.

Thereby, the DCO and the amplitude path DAC (AM-DAC) can be clocked with the clock $clk_{low}$ of the low frequency clock domain 102, where the RF transmitter can be clocked with the modulated clock $clk_{high}$ of the high frequency clock domain 104 that can be derived from the DCO clock.

In order to reduce the magnitude of the replication spectra, interpolation of the DCO and AM-DAC (AM=Amplitude Modulation) input signal to the RF frequency (or frequency $f_{clk,high}$ of the high frequency clock domain 104) can be applied. This process of interpolation is known as sample rate (up-) conversion (SRC). In a fully digital power RF transmitter, the data clock rate of digital signal processing (or frequency $f_{clk,low}$ of the low frequency clock domain 102) and the DCO frequency (or frequency $f_{clk,high}$ of the high frequency clock domain 104) have a non-integer ratio generally. These sample rate converters are referred to as fractional sample rate converters (FSRC) due to the fractional ratio of sample rates ($f_{clk,high}/f_{clk,low}$). This fractional ratio of clock rates (or sample rates) may cause problems in the data handover between the low frequency clock domain 102 and the high frequency clock domain 104. Therefore, a careful synchronization of the low frequency clock domain 102 and the high frequency clock domain 104 is vital.

Furthermore, in radio frequency (RF) systems a direct digital approach for a sample rate converter with arbitrary rational factors ($f_{clk,high}/f_{clk,low}$) as a cascade of interpolator and decimator cannot be applied due the high sampling rates ($f_{clk,high}$ greater the 1 GHZ) at the output. The sample rate converter is partitioned in a low frequency clock domain 102 (source domain) and a high frequency clock domain 104 (SYNC domain) circuit. The high frequency circuit block (e.g. the reload counter 111 and the second data processor 122) gets its input values (e.g. the number of clocks in the high frequency clock domain 114, the reload value 126_1 and the increment value 126_2) from the low frequency circuit block (e.g. the numerically controlled oscillator 106 and the first data processor 120) at the constant low frequency clock $clk_{low}$ period. Up-sampling of the data is done in the high frequency block (or second data processor 122). This can be done, for example, by the use of an integrator. The reload of the input data (or reload value 126_1 and increment value 126_2) is controlled by a reload counter 111 which defines the number of clock cycles (or number of clocks in the high frequency clock domain 114) used for integration.

Moreover, the number of count cycles (or number of clocks in the high frequency clock domain 114) of the reload counter 111 can be calculated in the numerically controlled oscillator 106 which runs also on the low frequency rate (or is clocked with the clock $clk_{low}$ of the low frequency clock domain 102). For the correct operation, it is valuable to have a setup and hold violation free data transfer (or handover) from the low frequency clock domain 102 to the high frequency clock domain 104. This can be achieved by synchronizing the count cycle of the reload counter 111 with the low frequency clock $clk_{low}$ signal.

As already mentioned, FIG. 3 shows the structure of the fractional sample rate converter 100. It comprises a low frequency part (or first data processor 120) which calculates the reload and increment values 126_1 and 126_2 for the fractional sample rate converter 100 running at the high frequency part (or second data processor 122) which can be a first or higher order integrator. The reload of the input values (e.g. reload value 126_1 and increment value 126_2) of the high frequency part 122 is controlled by a reload counter 111 which counts the number of high frequency clock cycles (or the clocks in the high frequency clock domain 104) used for integration in the high frequency part 122 (for an implementation example see FIG. 5). The number of clock cycles (or number of clocks in the high frequency clock domain 114) for one integration period of the high frequency integrator is calculated in a numerical controlled oscillator 106.

Figures 5, 5A:
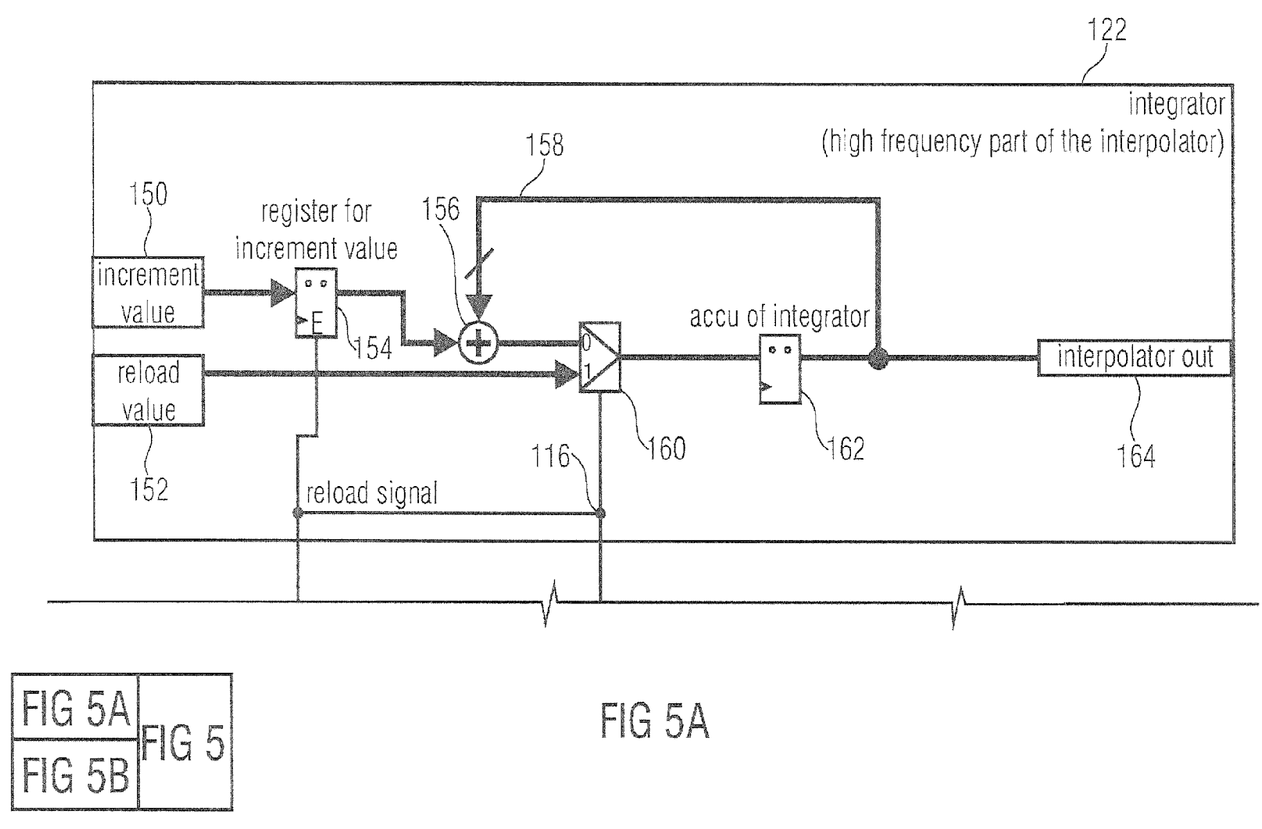
FIG. 5 shows a block diagram of the second data processor and the reload counter of the fractional sample rate converter shown in FIG. 3 according to an embodiment of the present invention.
Figure 5B:
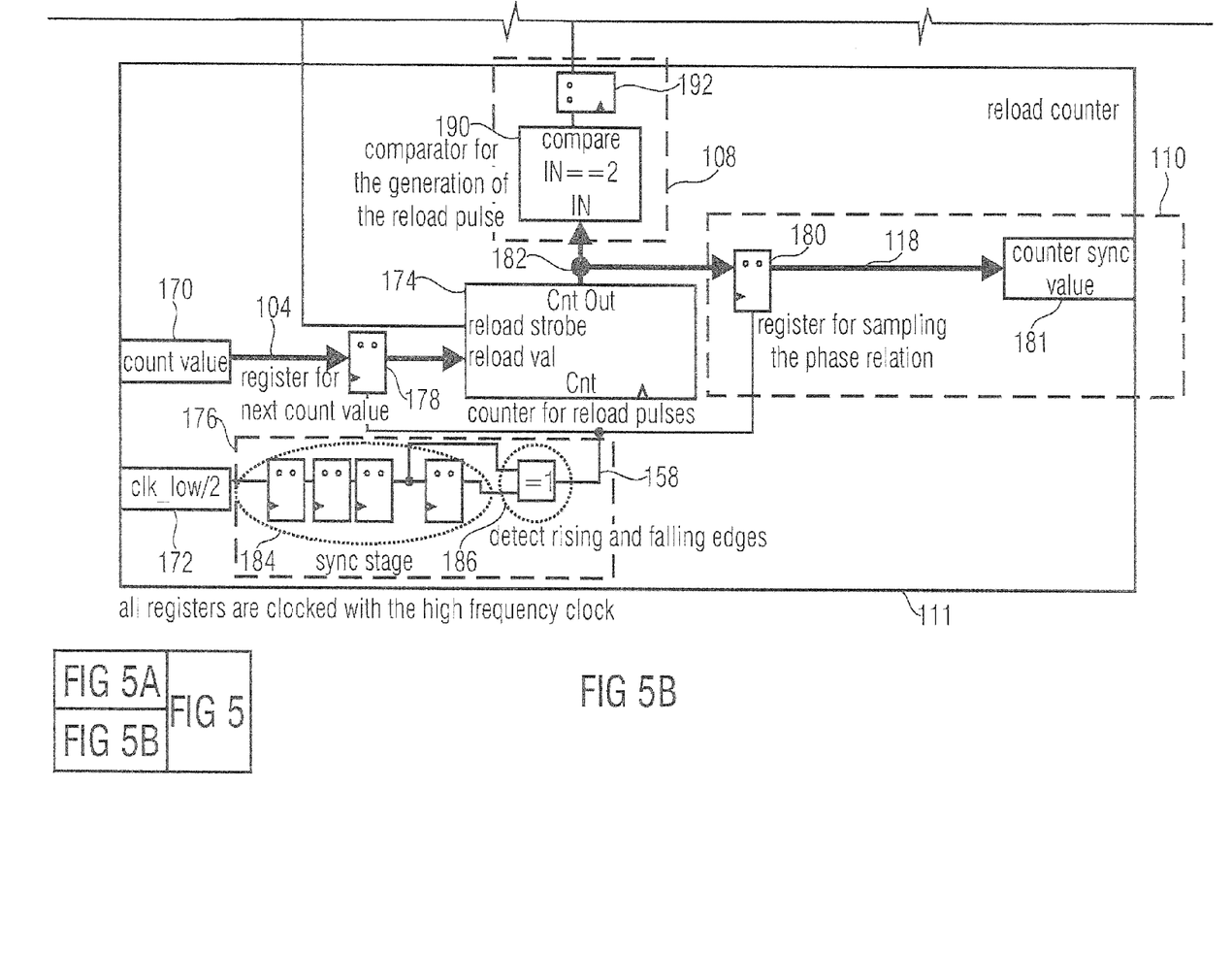

The reload signal 116 for the high frequency integrator (or second data processor 122) can be generated in the reload counter 111 (see FIG. 5). In order to enable a secure (set-up and hold violation free) data transfer from the low frequency clock domain 102 to the high frequency clock domain 104 the phase relation of this (or between the) reload signal 116 and the rising clock edges of the low frequency clock ($clk_{low}$) can be synchronized. Alternatively, the phase relation between the reload signal 116 and the falling clock edges of the low frequency clock $clk_{low}$ can be synchronized The numerically controlled oscillator 106 generates a sequence of count cycles (or sequence of the number of clocks in the high frequency clock domain 114) comprising the values N=floor(Frequency Ratio) and N+1. The mean value of this sequence equals the ratio of the fractional sample rate converter 100 high and low frequency ($f_{clk,high}/f_{clk,low}$). Thereby, the function N=floor(Frequency Ratio) may designate the largest integer N not greater than the frequency ratio. Naturally, the numerically controlled oscillator 106 may also be configured to generate other sequences of numbers of clocks in the high frequency clock domain 114, where an average of the numbers of clocks in the high frequency clock domain 114 corresponds to the frequency ratio between the clock frequency of the high frequency clock domain 104 and the clock frequency of the low frequency clock domain 102.

These values (or sequence of the number of clocks in the high frequency clock domain 114 items) are loaded into the reload counter 111 which is decremented to one at the high frequency clock rate (frequency $f_{clk,high}$ of the high frequency clock domain 104). When the value of one is reached in the reload counter 111 the reload signal 116 is generated and the new integrator input values (or reload value 126_1 and increment value 126_2) and the reload counter 111 are loaded with the next count value (or number of integrate cycles; number of clocks in the high frequency clock domain 114) which is already available in a local register (178 in FIG. 5). This register 178 is loaded on the re-synchronized low frequency clock edge (see FIG. 5). It has to be assured that the reload of this register (e.g. the register 178) is done before the next reload signal 116 is generated.

This implies that the average cycle period of the reload signals 116 equals the clock period of the low frequency clock $clk_{low}$. Thus, it is possible to synchronize the generation of the reload signal 116 with the low frequency clock $clk_{low}$ in such a way that a proper data handover from the low frequency clock domain 102 to the high frequency clock domain 104 is possible.

In order to enable this synchronization, the phase relationship between the low frequency clock $clk_{low}$ and the reload pulses 116 has to be measured. This measurement will be processed in the numerically controlled oscillator 106 which will establish the correct synchronization. The measurement of the phase relation will be done in the reload counter 111 (or more precisely by the phase information provider 110) which is clocked with the high frequency clock $clk_{high}$.

Figure 4:
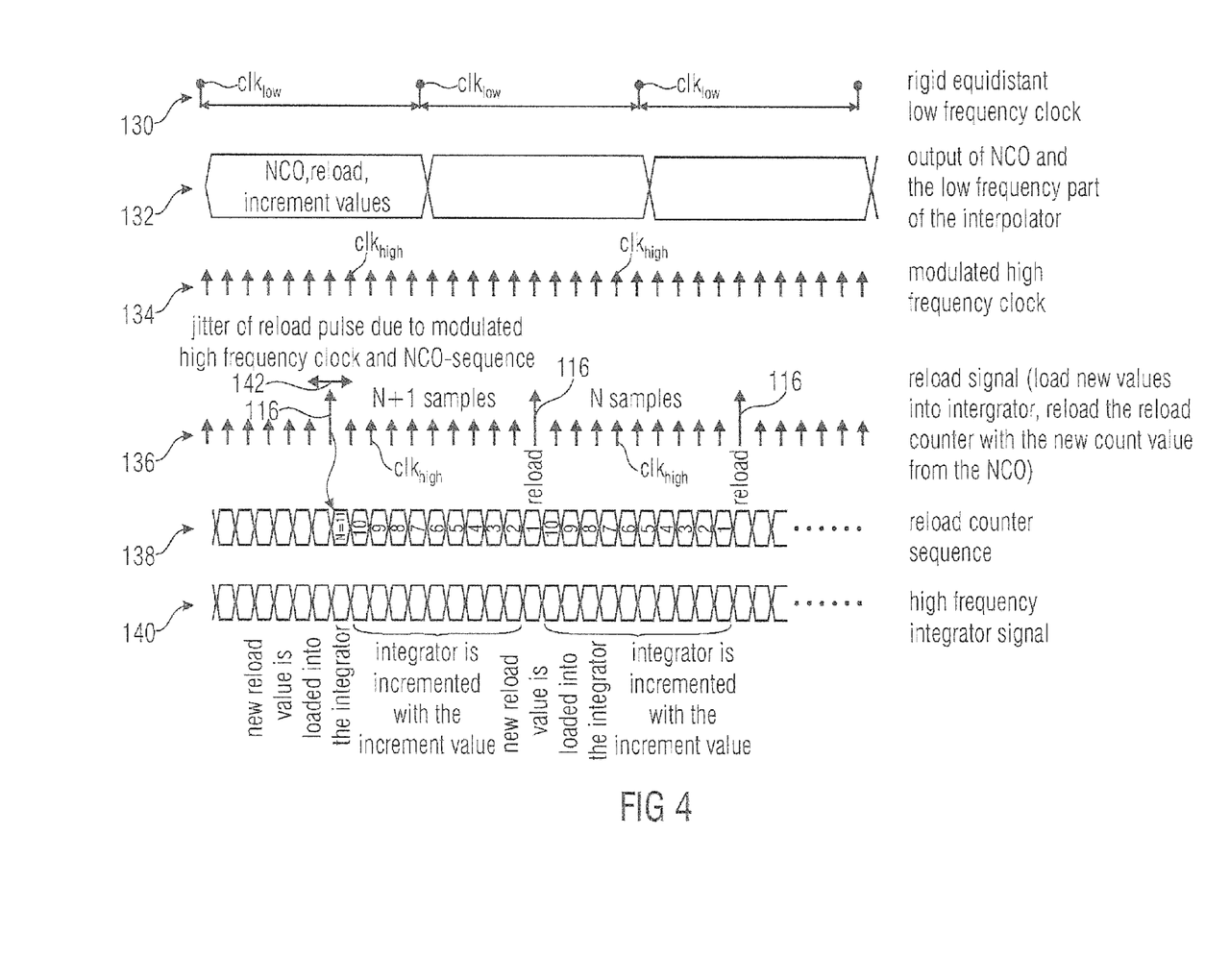
FIG. 4 shows in a diagram exemplary timings of the low frequency clock domain and the high frequency clock domain of the fractional sample rate converter shown in FIG. 3.

FIG. 4 shows in a diagram exemplary timings of the low frequency clock domain 102 and the high frequency clock domain 104 of the fractional sample rate converter 100 shown in FIG. 3. Thereby, in FIG. 4, from top to bottom are shown the timings 130 of the low frequency clock $clk_{low}$; the timings 132 of the output of the numerically controlled oscillator 106 and of the output of the first data processor 122; the timings 134 of the modulated high frequency clock $clk_{high}$; the timings 136 of the reload signal 116; the timings 138 of the reload counter sequence (or counter reading 182 in FIG. 5); and the timings of the high frequency output data 128. Note that in FIG. 4, the timings refer to clock edges, e.g. rising or falling clock edges, of the clock $clk_{high}$ of the high frequency clock domain 104 and the clock $clk_{low}$ of the low frequency clock domain 102, respectively.

The jitter 142 of the reload pulse 116 can be in the range of one high frequency clock $clk_{high}$ cycle period. Hence, the reload pulse 116 can be positioned in the middle of two low frequency clock $clk_{low}$ edges (e.g. rising or falling clock edges) to enable proper data transfer from the low frequency clock domain 102 to the high frequency clock domain 104.

When the frequency ratio ($f_{clk,high}/f_{clk,low}$) of high clock $clk_{high}$ and low clock $clk_{low}$ is sufficiently high, the jitter 142 of the reload pulse 116 can fit between two (subsequent) low frequency clock $clk_{low}$ cycles. This is a necessary condition for a setup- and hold-violation free data transfer from the low frequency clock domain 102 to the high frequency clock domain 104.

In a fractional sample rate converter 100 the numerically controlled oscillator sequence (or the sequence of the number of clocks in the high frequency clock domain 114) will be generated, for example, in a sigma-delta modulator. This sigma-delta modulated sequence determines the jitter 142 of the reload pulse 116 with respect to the low frequency clock $clk_{low}$ edges (e.g. rising or falling clock edges). The reload pulse 116 which is generated in the high frequency clock domain 104 of the fractional sample rate converter 100 can be positioned in the middle of two low frequency clock $clk_{low}$ edges to avoid the possibility of setup or hold violations. Therefore, the phase relationship between the reload pulse 116 and the low frequency clock $clk_{low}$ edges has to be measured (e.g. by the phase information provider 110). The measurement of the phase relation (or phase information 118) can be fed back (e.g. by the feedback path 112) into the numerically controlled oscillator 106 for the correction of the phase relation between low frequency clock $clk_{low}$ edges and reload pulses 116.

The phase relation can be measured by sampling the reload counter value (or counter reading 182 in FIG. 5) on the rising or falling clock edges of the low frequency clock $clk_{low}$. To ensure correct sampling of the reload counter 111 (or more precisely of the counter reading 182) the clock edge of the low frequency clock $clk_{low}$ can be synchronized into the high frequency clock domain 104. This gives additional timing uncertainty in the phase relation which has to be taken into account when synchronizing the low frequency clock domain 102 and the reload pulses 116.

FIG. 5 shows a block diagram of the second data processor 122 and the reload counter 111 of the fractional sample rate converter 100 shown in FIG. 3 according to an embodiment of the present invention. The second data processor 122 comprises an integrator configured to provide the reload value 126_1 as output data 128 in response to the reload signal 116, and increment the previous output data by the increment value 126_2 at each subsequent clock $clk_{high}$ of the high frequency clock domain 104.

The second data processor 122 comprises an input 150 for the increment value 126_2, an input 152 for the reload value 126_1, a register 154 for sampling the increment value 126_2, an adder 156, a feedback path 158 for feeding back the previous output data, a multiplexer 160, a register 162 for sampling the output data and an output 164 for providing the output data 128. Note that the above listed blocks of the second data processor 122 are clocked with the clock $clk_{high}$ of the high frequency clock domain 104.

The input 152 for the increment value 126_2 is coupled to an input of the register 154 for sampling the increment value in response to the reload signal 116. An output of the register 154 for sampling the increment value 126_2 and an output of the feedback path 158 for feeding back the previous output data are coupled to inputs of the adder 156. The adder 156 is configured to add the sampled increment value 126 and the previous output data in order increment the previous output data by the increment value 126. An output of the adder 156 and the input 152 for the reload value 126_1 are coupled to inputs of the multiplexer 160. The multiplexer 160 is configured to provide at its output the reload value 126_1 in response to the reload signal 116 and the incremented previous output data otherwise. The output of the multiplexer 160 is coupled to an input of the register 162 for sampling the output data 128 in synchronization with the high frequency clock domain 104. An output of the register 162 for sampling the output data 128 is coupled to the feedback path 158 and to the output 164 for providing the output data 128.

The reload counter 111 comprises the synchronization pulse generator 108, the phase information provider 110, an input 170 for the number of clocks 114 in the high frequency clock domain 104, an input 172 for the clock of the low frequency clock domain 102 divided by two ($clk_{low}/2$), a counter 174, a synchronization stage 176 and a register 178. Note that the above listed blocks of the reload counter 111 are clocked with the clock $clk_{high}$ of the high frequency clock domain 104.

The counter 174 is configured to count the clocks in the high frequency clock domain 104 and provide a counter reading 182. The synchronization pulse generator 108 is configured to generate the reload signal 116 based on the counter reading 182 such that the reload signal 116 is located at the time position defined by the number of clocks in the high frequency clock domain 114. Moreover, the counter reading 182 is reset upon generation of the reload signal 116.

The synchronization stage 176 comprises a plurality of registers 184 coupled in series and a detector circuit 186. The synchronization stage 176 is configured to synchronize the clock of the low frequency clock domain 102 divided by two ($clk_{low}/2$) into the high frequency clock domain 104, and to provide a trigger pulse 188 upon detecting a clock edge (e.g. rising or falling clock edge) of the low frequency clock domain 102. Thereby, the numerically controlled oscillator 106 is configured to provide the clock of the low frequency clock domain 102 divided by two ($clk_{low}/2$) in one embodiment.

As shown in FIG. 5, an input of a first register of the plurality of registers 184 of the synchronization stage 176 can be coupled to the input 172 for the clock of the low frequency clock domain 102 divided by two ($clk_{low}/2$). The detector circuit 186 can comprise an comparator, wherein a first input of the comparator can be coupled to an input of a last register of the plurality of registers 184 and a second input can be coupled to an output of the last register. The comparator can be configured to provide the trigger pulse 188 when the values present at the first and second input are complementary, e.g. when a binary zero is present at the first input and a binary one at the second input, or vice versa. Thereby, the comparator can be an XOR gate in one embodiment.

Furthermore, the input 170 for the number of clocks in the high frequency clock domain 114 can be coupled to an input of the register 178. The register 178 can be configured to sample the number of clocks in the high frequency clock domain 114 representing the synchronization pulse cycle duration information in response to the trigger pulse 188. The counter 174 can be configured to reset the counter reading 182 to the number of clocks in the high frequency clock domain 114 sampled by the register 178, and to count down the counter reading from the number of clocks in the high frequency clock domain 114 in synchronization with the clock $clk_{high}$ of the high frequency clock domain 104. In addition, the synchronization pulse generator 108 can be configured to compare the counter reading 188 with a predefined number and to generate the reload signal 116 when the predefined number is equal to the counter reading 188.

For example, the synchronization pulse generator 108 comprises a comparator 190 configured to compare the counter reading 188 with the predefined number (e.g. one) and generate the reload signal 116 when the predefined number is equal to the counter reading 188. Alternatively, the generator 108 can comprise a comparator 190 and a register 192. In that case, the comparator 190 is configured to compare the counter reading 188 with the predefined number (e.g. two) and generate the reload signal when the predefined number is equal to the counter reading 188, where the register 192 is configured to delay the reload signal by one high frequency clock $clk_{high}$ cycle.

Moreover, the phase information provider 110 can comprise a register 180 configured to sample the counter reading 182 in response to the trigger pulse 188. In that case, the feedback path 112 is configured to feed back the sampled counter reading 118 to the numerically controlled oscillator 106. Optionally, the phase information provider 110 can comprise an output 181 that is coupled to the register 180 and configured to provide the sampled counter reading 118 for the feedback path 112.

In other words, FIG. 5 shows a possible implementation of the fractional sample rate converter high frequency part comprising an integrator and the reload pulse generator (or reload counter 111). The reload pulse generator 111 comprises a counter 174 for counting the high frequency clock $clk_{high}$ edges for the generation of the reload pulse 116. When a reload pulse 116 is generated, this counter 174 is reloaded with the next reload value (or number of clocks in the high frequency clock domain 114). For the measurement of the phase relation of the low frequency clock $clk_{low}$ and the reload pulse 116 the counter value (or counter reading 182) is sampled on the low frequency clock $clk_{low}$ edge (or trigger pulse 188). Low frequency clock $clk_{low}$ edges are detected from the synchronized low frequency clock divided by two ($clk_{low}/2$).

The sampled counter value (or sampled counter reading 118) will be read back into the numerically controlled oscillator 106 (which runs on the low frequency clock $clk_{low}$). The numerically controlled oscillator 106 comprises a control loop (200 in FIG. 6) which corrects the reload values (or number of clocks in the high frequency clock domain 114) in such a way that the phase relation of the low frequency clock $clk_{low}$ and the reload pulse 116 enables a setup and hold violation free transfer of data from the low frequency clock domain 102 to the high frequency clock domain 104.

Figure 6:
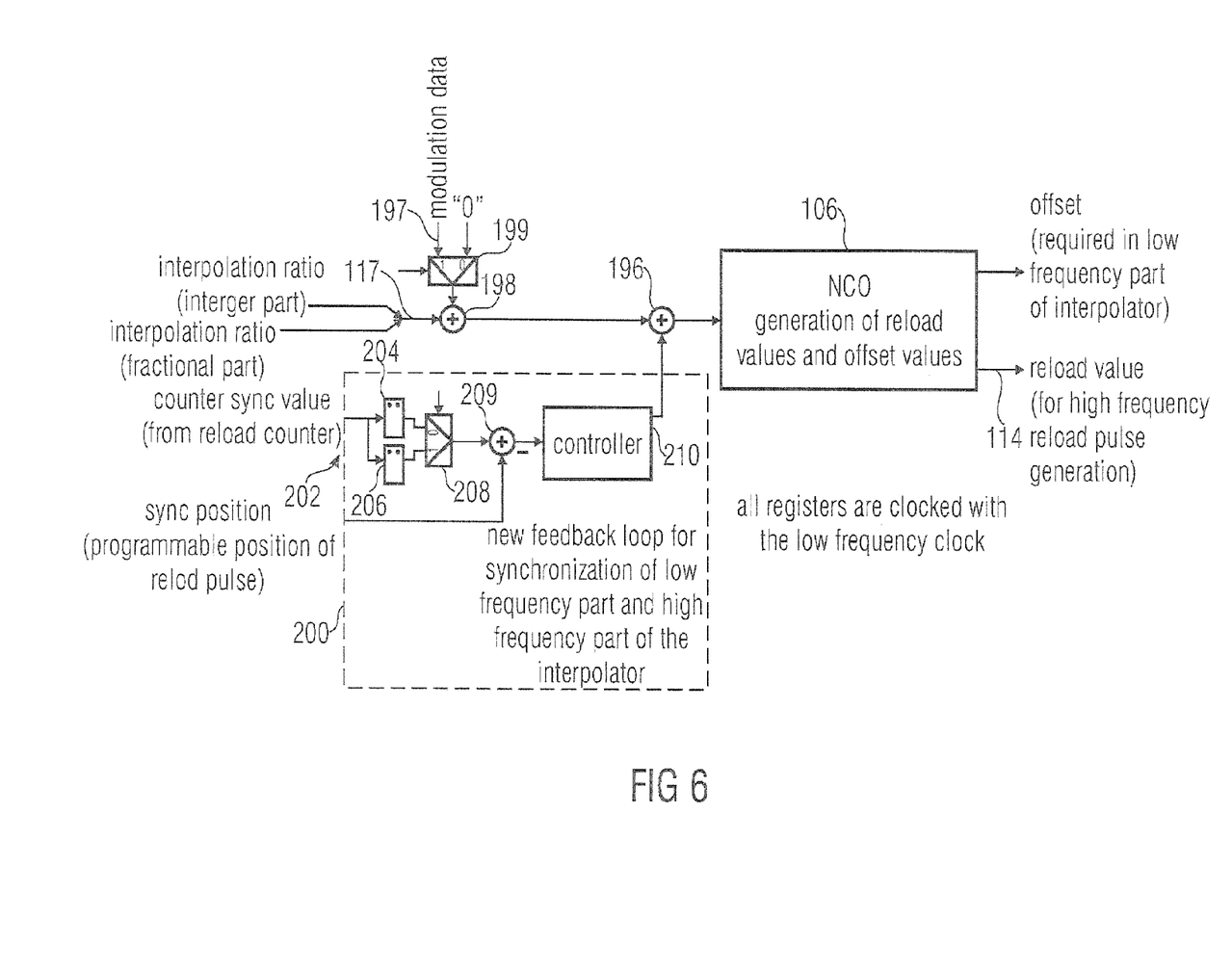
FIG. 6 shows a block diagram of the numerically controlled oscillator of the fractional sample rate converter shown in FIG. 3 further comprising a controller according to an embodiment of the present invention.

FIG. 6 shows a block diagram of the numerically controlled oscillator of the fractional sample rate converter shown in FIG. 3 further comprising a controller according to an embodiment of the present invention. The controller 210 is configured to regulate the number of clocks in the high frequency clock domain described by the synchronization pulse cycle duration information 114 to bring the sampled counter reading described by the phase information 118 towards a predefined counter reading described by a predetermined target phase information. Moreover, in one embodiment an output value of the controller 210 is combined (e.g. by means of a first adder 196) with a frequency ratio value 117 describing a frequency ratio between a clock frequency of the high frequency clock domain 104 and a clock frequency of the low frequency clock domain 102 to obtain the number of clocks in the high frequency clock domain described by the synchronization pulse cycle duration information 114. In other words, the controller 210 acts on the frequency ratio value 117 describing the ratio between the frequency of the high frequency clock domain 104 and the frequency of the low frequency clock domain 102 ($f_{clk,high}/f_{clk,low}$ or interpolation ratio) that is fed into the numerically controlled oscillator 106. The frequency ratio value 117 can comprise an integer and/or a fractional part.

For example, the frequency ratio value 117 fed into the numerically controlled oscillator 106 can be increased or decreased by adding an output value of the controller 210 to the frequency ratio value 117 by means of the first adder 196. In addition, a modulation data value 197 describing the modulation data can be added to the frequency ratio value 117 fed into the numerically controlled oscillator 106 by means of a second adder 198. Moreover, the second adder 198 can be coupled to an output of a multiplexer 199 that is configured to provide at its output, in dependence of a binary control signal, either the modulation data value 197 present at its first input or a reference value (e.g. zero) present at its second input.

Moreover, the numerically controlled oscillator 106 can comprise a feedback control loop 200 having an input 202 for the sampled counter reading 118, a first register 204, a second register 206, a multiplexer 208, an adder 209 and the controller 210. Note that the blocks shown in FIG. 6 and listed above are clocked with the clock of the low frequency clock domain 102.

The input 202 is coupled to an input of the first register 204 and to an input of the second register 206, where the first register 204 is configured to re-sample the sampled counter reading 118 in synchronization with the rising clock edge of the low frequency clock domain 102 and the second register 206 is configured to re-sample the sampled counter reading 118 in synchronization with the falling clock edge of the low frequency clock domain 102. Outputs of the first and second registers 204 and 206 are coupled to inputs of the multiplexer 208 that is configured to provide at its output, in dependence of a binary control signal, either the re-sampled counter reading 118 re-sampled by the first register 204 or the second register 206. The output of the multiplexer 208 is coupled to an adder 210 that is configured to subtract the predetermined counter reading from the re-sampled counter reading 118 in order to obtain a deviation from the predetermined. The predetermined counter reading can describe a programmable position of the reload signal 116. The deviation from the predetermined counter reading is fed into the controller 210.

The controller 210 comprises, in one embodiment, a P or PI controller (P=Proportional; PI=Proportional-Integral). Moreover, an output of the controller 210 is coupled to the first adder 196 in order to be added with the frequency ratio 117 that is fed into the numerically controlled oscillator 106.

In other words, FIG. 6 shows an implementation of the numerically controlled oscillator 106 with the control loop 200 for the synchronization of the low frequency clock domain 102 and the high frequency clock domain 104. A task of the numerically controlled oscillator 106 is to generate a sequence of reload counter values (or sequence of the number of clocks in the high frequency clock domain 114) and offset values from the fractional interpolation ratio 117. When the high frequency clock $clk_{high}$ is modulated (which is the case in RF communication systems) the modulation data 197 will be added (e.g. by the adder 198) to the interpolation ratio 117 to be taken into account in the interpolation ratio.

Synchronization of the high frequency clock domain 104 and the low frequency clock domain 102 is achieved by implementing a feedback loop (or control loop 200) which compares the measured position of the synchronized low frequency clock edges (counter sync value or counter reading 194) from the high frequency clock domain 104 with a desired position (sync position). The timing deviation of the clock edge will be fed back by a controller 210 which changes the interpolation ratio 117 of the numerically controlled oscillator 106 which will change the timing of the reload pulse 116 with respect to the low frequency clock $clk_{low}$ signal.

The controller 210 is, in one embodiment, a simple linear controller like a P or PI algorithm. It is also possible to implement a dead zone in the controller 210. This dead zone of the controller 210 can help to tolerate the jitter of the feedback value (or sampled counter reading 118) which is introduced by the timing uncertainty due to the synchronization of the low frequency clock $clk_{low}$ edges in the high frequency clock domain 104 (e.g. by the synchronization stage 176).

When the ratio of the high frequency to the low frequency ($f_{clk,high}/f_{clk,low}$) equals exactly the interpolation ratio of the numerically controlled oscillator 106 the controller 210 may just be active during the start-up phase of the interpolator (or fractional sample rate converter 100). Once the correct phase relationship is established no further action should be necessary. This will be the case when the interpolator 100 is operated inside a PLL (PLL=phase locked loop). If there is a difference in the actual interpolation ratio ($f_{clk,high}/f_{clk,low}$) and the interpolation ratio set in the numerically controlled oscillator 106 the controller 210 may try to correct the interpolation ratio of the numerically controlled oscillator 106. In this case a PI control algorithm can be used.

The mechanism for the synchronization of the low frequency clock domain 102 with the reload signal 116 in the high frequency clock domain 104 can be seen as a kind of a (fully digital) phase locked loop (PLL). This PLL comprises (like every PLL) a phase detector (sampling register 180 of the reload counter 111, or more precisely, of the phase information provider 110), a loop filter (controller 210 for correction of the numerically controlled oscillator 106 interpolation ratio $f_{clk,high}/f_{clk,low}$), and an oscillator which generates the phase signal (or reload signal 116) to be controlled (reload counter 111).

Embodiments of the present invention provide a correct and failsafe synchronization of two clock domains (or a low frequency clock domain 102 and a high frequency clock domain 104) for secure data handover by establishing a synchronized phase relation between the two clock domains. The circuitry (e.g. the second data processor 122 and the reload counter 111) running on the high frequency $f_{clk,high}$ can be kept as simple as possible in order to minimize circuit complexity and current consumption.

Moreover, embodiments of the present invention can be used in interpolation circuits, but they are not limited to these classes of circuits. In general, embodiments of the present invention can be utilized for data handover between two clock domains (or a low frequency clock domain 102 and a high frequency clock domain 104) where the reload of data on the higher clock rate (or frequency $f_{clk,high}$ of the high frequency clock domain 104) has to be done with the clock rate of the lower clock (or frequency $f_{clk,low}$ of the low frequency clock domain 102) signal.

Furthermore, embodiments of the present invention allow the adoption of a fully digital interpolation because they enable to synchronize a fixed low frequency clock $clk_{low}$ with a modulated high frequency clock $clk_{high}$ that can be derived from the DCO clock. Moreover, the synchronization of these two clock domains (or a low frequency clock domain 102 and a high frequency clock domain 104) allows an uncorrupted handover of data from one clock domain to the other.

In addition, embodiments of the present invention provide a mechanism for synchronized data handover between two different (arbitrary) clock domains (or a low frequency clock domain 102 and a high frequency clock domain 104) which can be applied, for example, in a fractional sample rate converter (FSRC). The fractional sample rate converter can be used in a fully digital RF transmitter for sample rate conversion (interpolation) between the digital frequency domain (or the low frequency clock domain 102) and the (modulated) radio frequency clock domain (or the high frequency clock domain 104). This is achieved by measuring the phase relationship between the two clock domains (or low frequency clock domain 102 and high frequency clock domain 104) on the high rate (or with the frequency $f_{clk,high}$ of the high frequency clock domain 104).

This measurement can be used in a feedback control loop (200 in FIG. 6), which operates on the low frequency $f_{clk,low}$ to adjust the timing relationship between the low frequency clock $clk_{low}$ and the reload signal 116 for data reload in the high frequency clock domain 104.

Figure 7:
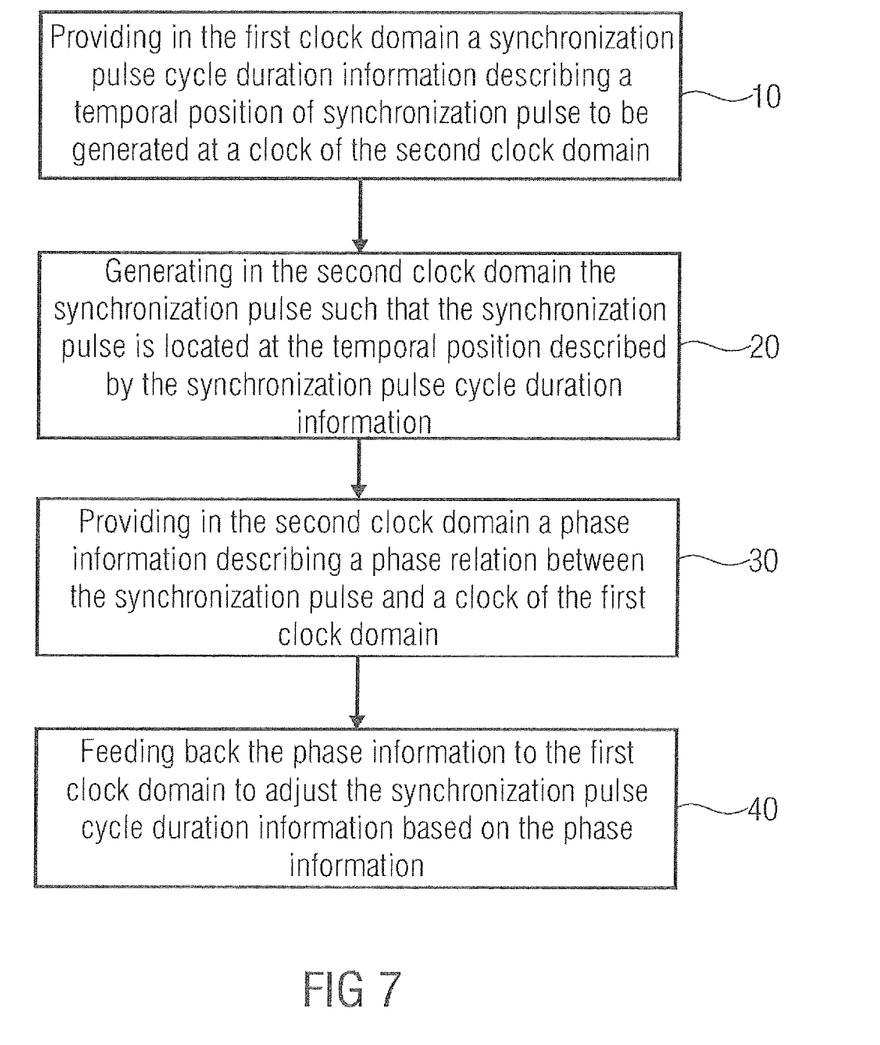
FIG. 7 shows a flow chart of a method for synchronizing a data handover between a first clock domain and a second clock domain.

FIG. 7 shows a flow chart of a method for synchronizing a data handover between a first clock domain and a second clock domain. While the method is provided below as a series of steps, the exact ordering of steps may be altered or in some cases performed concurrently. In addition, not all of the steps are necessarily required to fall within the scope of the invention. In a first step 10, a synchronization pulse cycle duration information describing a temporal position of a synchronization pulse to be generated at a clock of the second clock domain is provided in the first clock domain. In a second step 20, the synchronization pulse is generated in the second clock domain such that the synchronization pulse is located at the temporal position described by the synchronization pulse cycle duration information. In a third step 30, a phase information describing a phase relation between the synchronization pulse and a clock of the first clock domain is provided in the second clock domain. In a fourth step 40, the phase information is fed back to the first clock domain to adjust the synchronization pulse cycle duration information based on the phase information.

In some embodiments, the synchronization pulse cycle duration information can be provided such that the temporal position of the synchronization pulse is maintained within a predetermined area around a target position defined relative to the clock of the first clock domain.

Furthermore, the synchronization pulse cycle duration information can be provided such that the synchronization pulse cycle duration information represents a number of clocks in the second clock domain.

Moreover, the method for synchronizing the data handover between the first clock domain and the second clock domain can further comprise a step of counting the clocks of the second clock domain and providing a counter reading. Thereby, the synchronization pulse can be generated based on the counter reading such that the synchronization pulse is located at the temporal position defined by the number of clocks in the second clock domain. The counter reading can be reset upon generation of the synchronization pulse.

In addition, the method for synchronizing the data handover between the first clock domain and the second clock domain can further comprise the steps of processing an input data such that a data value is provided in synchronization with the first clock domain for handover to the second clock domain; receiving the data value in synchronization with the second clock domain and in response to the synchronization pulse; and processing the data value such that an output data is provided in synchronization with the second clock domain.

Further embodiments of the present invention provide a means for synchronizing a data handover between a first clock domain and a second clock domain, the means comprising a means for providing a synchronization pulse cycle duration information describing a temporal position of a synchronization pulse to be generated at a clock of the second clock domain. The means for providing the synchronization pulse cycle duration information is clocked with a clock of the first clock domain. The means for synchronizing the data handover further comprises a means for generating the synchronization pulse such that the synchronization pulse is located at the temporal position described by the synchronization pulse cycle duration information, wherein the means for generating the synchronization pulse is clocked with the clock of the second clock domain. In addition, a means for providing a phase information describing a phase relation between the synchronization pulse and a clock of the first clock domain is provided, wherein the means for providing the phase information is clocked with the clock of the second clock domain. Lastly, a means for feeding back the phase information to the means for providing the synchronization pulse cycle duration information is provided, wherein the means for providing the synchronization pulse cycle duration information is configured to adjust the synchronization pulse cycle duration information based on the phase information.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. Apparatus for synchronizing a data handover between a first clock domain and a second, different clock domain, the apparatus comprising:
a calculator clocked with a clock of the first clock domain and configured to receive phase information, to provide a synchronization pulse cycle duration information describing a temporal position of a synchronization pulse at a clock of the second clock domain, to adjust the synchronization pulse cycle duration information based on the phase information, and to provide a divided clock signal having a frequency substantially equal to half a frequency of the clock of the first clock domain;
a synchronization pulse generator clocked with the clock of the second clock domain and configured to receive the synchronization pulse cycle duration information from the calculator and to generate the synchronization pulse located at the temporal position described by the synchronization pulse cycle duration information;
a phase information provider clocked with the clock of the second clock domain and configured to provide the phase information describing a phase relation between the synchronization pulse and the clock of the first clock domain; and
a feedback path for feeding back the phase information to the calculator; and
a synchronization stage clocked with a clock of the second domain and configured to provide a synchronized version of the divided clock signal synchronized with the second domain, wherein the phase information provider is configured to receive the synchronized version of the divided clock signal.

2. The apparatus according to claim 1, wherein the calculator is configured to provide the synchronization pulse cycle duration information such that the temporal position of the synchronization pulse is maintained within a predetermined area around a target position defined relative to the clock of the first clock domain.

3. The apparatus according to claim 1, wherein the calculator is configured to provide the synchronization pulse cycle duration information such that the temporal position of the synchronization pulse is maintained within a predetermined area around a target position, the target position being centered between subsequent clock cycles of the clock of the first clock domain.

4. The apparatus according to claim 1, wherein the calculator is configured to provide the synchronization pulse cycle duration information such that the synchronization pulse cycle duration information describes the temporal position of the synchronization pulse at the clock of the second clock domain different from a position of the clock of the first clock domain.

5. The apparatus according to claim 1, wherein the calculator is configured to provide the synchronization pulse cycle duration information such that the synchronization pulse cycle duration information represents a number of clocks in the second clock domain.

6. The apparatus according to claim 5, further comprising a counter clocked with the clock of the second clock domain and configured to count the clock cycles of the clock in the second clock domain and provide a counter reading based on the count, wherein the synchronization pulse generator is configured to generate the synchronization pulse based on the counter reading such that the synchronization pulse is located at the temporal position described by the number of clock cycles of the clock in the second clock domain that is represented by the synchronization pulse cycle duration information, and wherein the counter reading is set to an initial value in response to the generation of the synchronization pulse.

7. The apparatus according to claim 6, wherein the synchronization stage comprises a plurality of registers coupled in series and a detector circuit, and wherein the synchronization stage is configured to provide a trigger pulse in synchronization with the second clock domain and in response to a clock edge of the divided clock signal.

8. The apparatus according to claim 7, wherein the phase information provider comprises a register configured to sample the counter reading in response to the trigger pulse, wherein the feedback path is configured to feed back the sampled counter reading to the calculator.

9. The apparatus according to claim 7, wherein the apparatus further comprises a register configured to sample a number of clock cycles of the clock in the second clock domain represented by the synchronization pulse cycle duration information in response to the trigger pulse, to thereby accept the synchronization pulse cycle duration information in the second clock domain.

10. The apparatus according to claim 9, wherein the counter is configured to set the counter reading to the number of clock cycles of the clock in the second clock domain represented by the synchronization pulse cycle duration information and sampled by the register, and is further configured to count down the counter reading from the set counter reading in synchronization with the clock of the second clock domain, and wherein the synchronization pulse generator is configured to compare the counter reading with a predefined number and generate the synchronization pulse when the predefined number is equal to the counter reading.

11. The apparatus according to claim 1, wherein the calculator is configured to provide the synchronization pulse cycle duration information such that the synchronization pulse cycle duration information describes a number of clock cycles of the clock in the second clock domain, and provide the synchronization pulse cycle duration information such that a mean of the number of clock cycles of the clock in the second clock domain described by a sequence of synchronization pulse cycle duration information items corresponds to a ratio between a frequency of the second clock domain and a frequency of the first clock domain.

12. The apparatus according to claim 1, wherein the clock of the second clock domain is modulated, wherein the calculator is configured to adjust the synchronization pulse cycle duration information based on modulation data describing a modulation of the clock of the second clock domain.

13. The apparatus according to claim 1, wherein the calculator comprises a controller configured to regulate the synchronization pulse cycle duration information to bring the phase information towards a predetermined target phase information.

14. The apparatus according to claim 13, wherein the calculator is configured to combine an output value of the controller with a frequency ratio value describing a frequency ratio between a clock frequency of the second clock domain and a clock frequency of the first clock domain to obtain the synchronization pulse cycle duration information.

15. The apparatus according to claim 1, further comprising:
a first data processor clocked with the clock of the first clock domain and configured to process an input data such that a data value is provided in synchronization with the first clock domain for handover to the second clock domain; and
a second data processor clocked with the clock of the second clock domain and configured to receive the data value in response to the synchronization pulse, in synchronization with the second clock domain and to process the data value such that an output data is provided in synchronization with the second clock domain.

16. An apparatus for synchronizing a data handover between a first clock domain and a second, different clock domain, the apparatus comprising:
a calculator clocked with a clock of the first clock domain and configured to provide a synchronization pulse cycle duration information describing a temporal position of a synchronization pulse at a clock of the second clock domain and to adjust the synchronization pulse cycle duration information based on a phase information, and to provide a divided clock signal;
a synchronization pulse generator clocked with the clock of the second clock domain and configured to receive the synchronization pulse cycle duration information from the calculator and to generate the synchronization pulse located at the temporal position described by the synchronization pulse cycle duration information;
a phase information provider clocked with the clock of the second clock domain and configured to provide the phase information describing a phase relation between the synchronization pulse and the clock of the first clock domain;
a feedback path for feeding back the phase information to the calculator;
a first data processor clocked with the clock of the first clock domain and configured to process an input data such that a reload value and an increment value are provided in synchronization with the first clock domain for handover to the second clock domain;
a second data processor clocked with the clock of the second clock domain and configured to receive the reload value and the increment value in synchronization with the second clock domain and in response to the synchronization pulse, and process the reload value and the increment value such that an output data is provided in synchronization with the second clock domain; and
a synchronization stage clocked with the clock of the second domain and configured to provide a synchronized version of the divided clock synchronized with the second domain, wherein the phase information provider is configured to receive the synchronized version of the divided clock signal.

17. The apparatus according to claim 16, comprising a counter clocked with the clock of the second clock domain and configured to count clock cycles of the clock in the second clock domain and provide a counter reading, wherein the synchronization pulse generator is configured to generate the synchronization pulse based on the counter reading such that the synchronization pulse is located at the temporal position described by the number of clock cycles in the second clock domain that is represented by the synchronization pulse cycle duration information, and wherein the counter reading is set to an initial value in response to the generation of the synchronization pulse.

18. The apparatus according to claim 17, further comprising:
a counter clocked with the clock of the second clock domain and configured to count clock cycles of the clock in the second clock domain and provide a counter reading, wherein the synchronization pulse generator is configured to generate the synchronization pulse based on the counter reading such that the synchronization pulse is located at the time position defined by the number of clock cycles of the clock in the second clock domain, and wherein the counter reading is reset upon generation of the synchronization pulse.

19. The apparatus according to claim 16, wherein the second data processor comprises an integrator configured to provide the reload value as output data in response to the synchronization pulse and increment the previous output data by the increment value at each subsequent clock cycle of the clock of the second clock domain.

20. An apparatus for synchronizing a data handover between a first clock domain and a second, different clock domain, the apparatus comprising:
a means for receiving a phase information, providing a synchronization pulse cycle duration information describing a temporal position of a synchronization pulse at a clock of the second clock domain and providing a divided clock signal having a frequency substantially equal to half a frequency of a clock of the of the first clock domain, wherein the means for providing the synchronization pulse cycle duration information is clocked with the clock of the first clock domain, and adjusting the synchronization pulse cycle duration information based on the phase information;
a means for generating the synchronization pulse such that the synchronization pulse is located at the temporal position described by the synchronization pulse cycle duration information, wherein the means for generating the synchronization pulse is clocked with the clock of the second clock domain;

a means for providing a phase information describing a phase relation between the synchronization pulse and the clock of the first clock domain, wherein the means for providing the phase information is clocked with the clock of the second clock domain; and a means for feeding back the phase information to the means for receiving the phase information; and a means for providing a synchronized version of the divided clock signal synchronized with the second domain, wherein the means for providing the phase information is configured to receive the synchronized version of the divided clock signal.

21. A method for synchronizing a data handover between a first clock domain and a second, different clock domain, the method comprising:

providing in the first clock domain a synchronization pulse cycle duration information describing a temporal position of a synchronization pulse at a clock of the second clock domain;

providing a divided clock signal having a frequency substantially equal to half a frequency of a clock of the first clock domain;

providing a synchronized version of the divided clock signal, wherein the synchronized version is synchronized with the second domain;

generating in the second clock domain the synchronization pulse located at the temporal position described by the synchronization pulse cycle duration information;

providing in the second clock domain a phase information describing a phase relation between the synchronization pulse and the clock of the first clock domain;

feeding back the phase information to the first clock domain; and adjusting the synchronization pulse cycle duration information based on the phase information.

22. The method according to claim 21, wherein the synchronization pulse cycle duration information represents, in the form of coded numeric value, a number of clock cycles of the clock in the second clock domain.

23. The method according to claim 22, comprising counting in response to clock cycles of the clock of the second clock domain and providing a counter reading, wherein the synchronization pulse is generated based on the counter reading such that a temporal position of the synchronization pulse is adjusted based on the synchronization pulse cycle duration information, and wherein the counter reading is set to an initial value in response to a generation of the synchronization pulse.

24. The method according to claim 21, further comprising:

processing an input data such that a data value is provided in synchronization with the first clock domain for handover to the second clock domain;

receiving the data value in synchronization with the second clock domain and in response to the synchronization pulse; and processing the data value such that an output data is provided in synchronization with the second clock domain.

25. A computer readable digital, non-transitory storage medium having stored thereon a computer program having a program code for performing, when running on a computer, a method for synchronizing a data handover between a first clock domain and a second clock domain, the method comprising:

providing in the first clock domain a synchronization pulse cycle duration information describing a temporal position of a synchronization pulse to be generated at a clock of the second clock domain;

providing in the first clock domain, a divided clock signal having a frequency substantially equal to half a frequency of a clock of the first domain;

providing in the second clock domain, a synchronized version of the divided clock synchronized with the second clock domain;

generating in the second clock domain the synchronization pulse located at the temporal position described by the synchronization pulse cycle duration information;

providing in the second clock domain a phase information describing a phase relation between the synchronization pulse and the clock of the first clock domain;

feeding back the phase information to the first clock domain; and adjusting the synchronization pulse cycle duration information based on the phase information.

* * * * *